(12) United States Patent
Allegretti et al.

(10) Patent No.: US 11,173,826 B2
(45) Date of Patent: Nov. 16, 2021

(54) BULK MATERIAL SHIPPING CONTAINER TRAILER

(71) Applicant: SANDBOX LOGISTICS, LLC, Houston, TX (US)

(72) Inventors: C. John Allegretti, Barrington Hills, IL (US); Kevin Sylvester Corrigan, Forest Park, IL (US); Angelo L. Flamingo, Ottawa, IL (US)

(73) Assignee: SANDBOX ENTERPRISES, LLC, Katy, TX (US)

( * ) Notice: Subject to any disclaimer, the term of this patent is extended or adjusted under 35 U.S.C. 154(b) by 341 days.

(21) Appl. No.: 16/439,321

(22) Filed: Jun. 12, 2019

(65) Prior Publication Data
US 2020/0391647 A1    Dec. 17, 2020

(51) Int. Cl.
*B60P 1/56* (2006.01)
*B60P 1/64* (2006.01)
*B62D 63/08* (2006.01)
*B60P 3/00* (2006.01)

(52) U.S. Cl.
CPC .............. *B60P 1/56* (2013.01); *B60P 1/6418* (2013.01); *B60P 3/00* (2013.01); *B62D 63/08* (2013.01)

(58) Field of Classification Search
CPC .......... B60P 1/56; B60P 1/6418; B62D 63/08
USPC ........................................................ 298/27
See application file for complete search history.

(56) References Cited

U.S. PATENT DOCUMENTS

| | | |
|---|---|---|
| 710,611 A | 10/1902 | Ray |
| 917,649 A | 4/1909 | Otto |
| 2,385,245 A | 9/1945 | Victor |
| 2,563,470 A | 8/1951 | Kane |
| 2,652,174 A | 9/1953 | West et al. |
| 2,670,866 A | 3/1954 | David |
| 2,678,737 A | 5/1954 | Mangrum |
| 2,802,603 A | 8/1957 | Cecil |
| 3,049,248 A | 8/1962 | Heltzel et al. |
| 3,083,879 A | 4/1963 | Coleman |
| 3,151,779 A | 10/1964 | Rensch et al. |
| 3,318,473 A | 5/1967 | Jones et al. |
| 3,343,688 A | 9/1967 | Arnold |
| 3,354,918 A | 11/1967 | Coleman |
| 3,476,270 A | 11/1969 | Cox et al. |
| 3,602,400 A | 8/1971 | Cooke |
| 3,785,534 A | 1/1974 | Smith |
| 3,802,584 A | 4/1974 | Sackett et al. |
| 3,986,708 A | 10/1976 | Heltzel et al. |
| 4,023,719 A | 5/1977 | Noyon |
| 4,058,239 A | 11/1977 | Van |
| 4,178,117 A | 12/1979 | Brugler |
| 4,204,773 A | 5/1980 | Bates |

(Continued)

FOREIGN PATENT DOCUMENTS

| | | |
|---|---|---|
| EP | 2937826 A1 | 10/2015 |
| GB | 2066220 A | 7/1981 |

(Continued)

*Primary Examiner* — Hilary L Gutman
(74) *Attorney, Agent, or Firm* — Lorenz & Kopf, LLP

(57) ABSTRACT

A bulk material shipping container trailer includes a base structure, a container support assembly, and a gate moving assembly positioned between the base structure and a container loaded onto the trailer, to enable material in the container to be unloaded from the container through the gate moving assembly and the base structure.

9 Claims, 10 Drawing Sheets

(56) References Cited

U.S. PATENT DOCUMENTS

| | | | |
|---|---|---|---|
| 4,258,953 A | 3/1981 | Johnson |
| 4,313,708 A | 2/1982 | Tiliakos |
| 4,398,653 A | 8/1983 | Daloisio |
| 4,626,166 A | 12/1986 | Jolly |
| 4,701,095 A | 10/1987 | Berryman et al. |
| 4,856,681 A | 8/1989 | Murray |
| 4,919,583 A | 4/1990 | Speakman |
| 4,956,821 A | 9/1990 | Fenelon |
| 4,993,883 A | 2/1991 | Jones |
| 5,036,979 A | 8/1991 | Selz |
| 5,096,096 A | 3/1992 | Calaunan |
| 5,339,996 A | 8/1994 | Dubbert et al. |
| 5,375,730 A | 12/1994 | Bahr et al. |
| 5,413,154 A | 5/1995 | Hurst et al. |
| 5,441,321 A | 8/1995 | Karpisek |
| 5,445,289 A | 8/1995 | Owen |
| 5,722,552 A | 3/1998 | Olson |
| 5,913,459 A | 6/1999 | Gill et al. |
| 5,927,356 A | 7/1999 | Henderson |
| 5,944,470 A | 8/1999 | Bonerb |
| 5,997,099 A | 12/1999 | Collins |
| 6,059,372 A | 5/2000 | Mcdonald et al. |
| 6,247,594 B1 | 6/2001 | Garton |
| 6,537,015 B2 | 3/2003 | Lim et al. |
| 6,568,567 B2 | 5/2003 | Mckenzie et al. |
| 6,622,849 B1 | 9/2003 | Sperling |
| 7,008,163 B2 | 3/2006 | Russell |
| 7,086,342 B2 | 8/2006 | Oneall et al. |
| 7,100,896 B1 | 9/2006 | Cox |
| 7,252,309 B2 | 8/2007 | Goh et al. |
| 7,284,579 B2 | 10/2007 | Elgan et al. |
| 7,475,796 B2 | 1/2009 | Garton |
| 7,500,817 B2 | 3/2009 | Furrer et al. |
| 7,762,281 B2 | 7/2010 | Schuld |
| 7,997,213 B1 | 8/2011 | Gauthier et al. |
| 8,387,824 B2 | 3/2013 | Wietgrefe |
| 8,434,990 B2 | 5/2013 | Claussen |
| D688,349 S | 8/2013 | Oren et al. |
| D688,350 S | 8/2013 | Oren et al. |
| D688,351 S | 8/2013 | Oren et al. |
| D688,772 S | 8/2013 | Oren et al. |
| 8,505,780 B2 | 8/2013 | Oren |
| 8,545,148 B2 | 10/2013 | Wanek-Pusset et al. |
| 8,573,917 B2 | 11/2013 | Renyer |
| 8,585,341 B1 | 11/2013 | Oren et al. |
| 8,607,289 B2 | 12/2013 | Brown et al. |
| 8,616,370 B2 | 12/2013 | Allegretti et al. |
| 8,622,251 B2 | 1/2014 | Oren |
| 8,668,430 B2 | 3/2014 | Oren et al. |
| D703,582 S | 4/2014 | Oren |
| 8,827,118 B2 | 9/2014 | Oren |
| 8,887,914 B2 | 11/2014 | Allegretti et al. |
| RE45,713 E | 10/2015 | Oren et al. |
| 9,162,603 B2 | 10/2015 | Oren |
| RE45,788 E | 11/2015 | Oren et al. |
| 9,248,772 B2 | 2/2016 | Oren |
| RE45,914 E | 3/2016 | Oren et al. |
| 9,296,518 B2 | 3/2016 | Oren |
| 9,309,064 B2 | 4/2016 | Sheesley |
| 9,340,353 B2 | 5/2016 | Oren et al. |
| 9,358,916 B2 | 6/2016 | Oren |
| 9,394,102 B2 | 7/2016 | Oren et al. |
| 9,403,626 B2 | 8/2016 | Oren |
| 9,421,899 B2 | 8/2016 | Oren |
| 9,440,785 B2 | 9/2016 | Oren et al. |
| 9,446,801 B1 * | 9/2016 | Oren ............... B62D 53/06 |
| 9,475,661 B2 | 10/2016 | Oren |
| 9,511,929 B2 | 12/2016 | Oren |
| 9,522,816 B2 | 12/2016 | Taylor |
| 9,527,664 B2 | 12/2016 | Oren |
| 9,580,238 B2 | 2/2017 | Friesen et al. |
| RE46,334 E | 3/2017 | Oren et al. |
| D780,883 S | 3/2017 | Schaffner et al. |
| D783,771 S | 4/2017 | Stegemoeller et al. |
| D783,772 S | 4/2017 | Stegemoeller, III et al. |
| 9,617,066 B2 | 4/2017 | Oren |
| 9,624,030 B2 | 4/2017 | Oren et al. |
| 9,624,036 B2 | 4/2017 | Luharuka et al. |
| 9,643,774 B2 | 5/2017 | Oren |
| 9,650,216 B2 | 5/2017 | Allegretti |
| 9,656,799 B2 | 5/2017 | Oren et al. |
| 9,669,993 B2 | 6/2017 | Oren et al. |
| 9,670,752 B2 | 6/2017 | Glynn et al. |
| 9,676,554 B2 | 6/2017 | Glynn et al. |
| 9,682,815 B2 | 6/2017 | Oren |
| 9,694,970 B2 | 7/2017 | Oren et al. |
| 9,701,463 B2 | 7/2017 | Oren et al. |
| 9,718,609 B2 | 8/2017 | Oren et al. |
| 9,718,610 B2 | 8/2017 | Oren |
| 9,725,233 B2 | 8/2017 | Oren et al. |
| 9,725,234 B2 | 8/2017 | Oren et al. |
| 9,738,439 B2 | 8/2017 | Oren et al. |
| RE46,531 E | 9/2017 | Oren et al. |
| 9,758,081 B2 | 9/2017 | Oren |
| 9,758,082 B2 * | 9/2017 | Eiden, III ............... B65G 65/42 |
| 9,771,224 B2 | 9/2017 | Oren et al. |
| 9,840,366 B2 | 12/2017 | Oren et al. |
| 10,569,953 B2 * | 2/2020 | Oren ....................... B65G 65/40 |
| 10,661,981 B2 * | 5/2020 | Oren ....................... B65D 88/28 |
| 2005/0161994 A1 * | 7/2005 | Heider ...................... B60P 1/56 |
| | | 298/27 |
| 2006/0156947 A1 * | 7/2006 | Heider ..................... B61D 7/20 |
| | | 105/250 |
| 2008/0187423 A1 | 8/2008 | Mauchle et al. |
| 2009/0078410 A1 | 3/2009 | Krenek et al. |
| 2009/0129903 A1 | 5/2009 | Lyons |
| 2009/0314791 A1 | 12/2009 | Hartley et al. |
| 2010/0104408 A1 * | 4/2010 | Gaudet ..................... B60G 5/00 |
| | | 414/495 |
| 2012/0017812 A1 | 1/2012 | Renyer et al. |
| 2012/0152798 A1 * | 6/2012 | Allegretti ............. B65D 77/061 |
| | | 206/599 |
| 2013/0022441 A1 | 1/2013 | Uhryn et al. |
| 2014/0023463 A1 | 1/2014 | Oren |
| 2014/0083554 A1 | 3/2014 | Harris |
| 2014/0305769 A1 | 10/2014 | Eiden, III et al. |
| 2015/0003955 A1 | 1/2015 | Oren et al. |
| 2015/0183578 A9 | 7/2015 | Oren et al. |
| 2015/0191318 A1 | 7/2015 | Martel |
| 2015/0284194 A1 | 10/2015 | Oren et al. |
| 2015/0368052 A1 | 12/2015 | Sheesley |
| 2015/0375930 A1 | 12/2015 | Oren et al. |
| 2016/0031658 A1 | 2/2016 | Oren et al. |
| 2016/0039433 A1 | 2/2016 | Oren et al. |
| 2016/0046438 A1 | 2/2016 | Oren et al. |
| 2016/0046454 A1 | 2/2016 | Oren et al. |
| 2016/0068342 A1 | 3/2016 | Oren et al. |
| 2016/0130095 A1 | 5/2016 | Oren et al. |
| 2016/0244279 A1 | 8/2016 | Oren et al. |
| 2016/0264352 A1 | 9/2016 | Oren |
| 2016/0332809 A1 | 11/2016 | Harris |
| 2016/0332811 A1 | 11/2016 | Harris |
| 2017/0129696 A1 | 5/2017 | Oren |
| 2017/0144834 A1 | 5/2017 | Oren et al. |
| 2017/0190523 A1 | 7/2017 | Oren et al. |
| 2017/0203915 A1 | 7/2017 | Oren |
| 2017/0217671 A1 | 8/2017 | Allegretti |
| 2017/0225883 A1 | 8/2017 | Oren |
| 2017/0240350 A1 | 8/2017 | Oren et al. |
| 2017/0240361 A1 | 8/2017 | Glynn et al. |
| 2017/0240363 A1 | 8/2017 | Oren |
| 2017/0267151 A1 | 9/2017 | Oren |
| 2017/0283165 A1 | 10/2017 | Oren et al. |
| 2017/0320660 A1 | 11/2017 | Sanders et al. |
| 2018/0002066 A1 * | 1/2018 | Allegretti ............... B65D 19/38 |
| 2018/0002120 A1 | 1/2018 | Allegretti et al. |
| 2018/0050864 A1 * | 2/2018 | Oren ....................... B65G 65/30 |

(56) References Cited

U.S. PATENT DOCUMENTS

2020/0156855 A1\*   5/2020   Allegretti ............... B65D 19/08
2020/0346701 A1\*  11/2020   Allegretti ............... B62D 21/09

FOREIGN PATENT DOCUMENTS

| | | | |
|---|---|---|---|
| GB | 2204847 | A  | 11/1988 |
| JP | 2008239019 | A  | 10/2008 |
| WO | 2008012513 | A2 | 1/2008 |
| WO | 2013095871 | A1 | 6/2013 |
| WO | 2013142421 | A1 | 9/2013 |
| WO | 2014018129 | A1 | 1/2014 |
| WO | 2014018236 | A2 | 1/2014 |
| WO | 2015119799 | A1 | 8/2015 |
| WO | 2015191150 | A1 | 12/2015 |
| WO | 2015192061 | A1 | 12/2015 |
| WO | 2016044012 | A1 | 3/2016 |
| WO | 2016160067 | A1 | 10/2016 |
| WO | 2016178691 | A1 | 11/2016 |
| WO | 2016178692 | A1 | 11/2016 |
| WO | 2016178694 | A1 | 11/2016 |
| WO | 2016178695 | A1 | 11/2016 |
| WO | 2017014768 | A1 | 1/2017 |
| WO | 2017014771 | A1 | 1/2017 |
| WO | 2017014774 | A1 | 1/2017 |
| WO | 2017027034 | A1 | 2/2017 |
| WO | 2017095423 | A1 | 6/2017 |

\* cited by examiner

BULK MATERIAL SHIPPING CONTAINER TRAILER

BACKGROUND

Various bulk material shipping containers are known. Such known material bulk shipping containers, sometimes referred to herein for brevity as known containers or as known bulk containers, are used to transport a wide range of products, parts, components, items, and materials such as, but not limited to, seeds, shavings, fasteners, and granular materials (such as sand). These are sometimes called loose materials or materials. New and improved bulk material shipping containers are continuously being developed. For example, U.S. Published Patent Application No. 2018/0002066, which is owned by the assignee of the present application and incorporated herein by reference, discloses relatively new bulk material shipping containers.

As these new bulk material shipping containers are developed, there is a continuing need to develop unloading devices that can be used for unloading loose materials from these new bulk material shipping containers. In various uses, certain of these new bulk material shipping containers need to be supported substantially above the ground to be unloaded. New and improved bulk material shipping container unloader apparatus are continuously being developed. For example, U.S. Published Patent Application No. 2018/0002120, which is owned by the assignee of the present application and incorporated herein by reference, discloses relatively new bulk material shipping container unloader apparatus.

As these new bulk material shipping containers are developed, there is a continuing need to develop transporting devices that can be used for transporting these new bulk material shipping containers.

SUMMARY

Various embodiments of the present disclosure provide bulk material shipping container trailer that meets the above need. Various embodiments of the present disclosure include a trailer having a base structure, a container support assembly, and a gate opening assembly. The base structure includes a container support assembly connection section, to which the container support assembly is connected. The container support assembly includes one or more corner nesting supports and one or more lateral support arms each connected to one of the one or more corner nesting supports. The container support assembly is configured to carry a full bulk material shipping container. The gate opening assembly is connected to the container support assembly connection section, and is configured to fit between the base structure and a bulk material shipping container when the bulk material shipping container is positioned on the container support assembly. The gate opening assembly is configured to engage a gate of the bulk material shipping container, to enable material to be unloaded from a bottom of the container through the gate opening assembly and base structure. This enables a bulk material shipping container to be transported by the trailer, and the contents of the container to be unloaded from the container without removing the container from the trailer.

Additional features and advantages of the present invention are described in, and will be apparent from, the following Detailed Description of Exemplary Embodiments and the figures.

DETAILED DESCRIPTION OF EXEMPLARY EMBODIMENTS

Figure 1A:
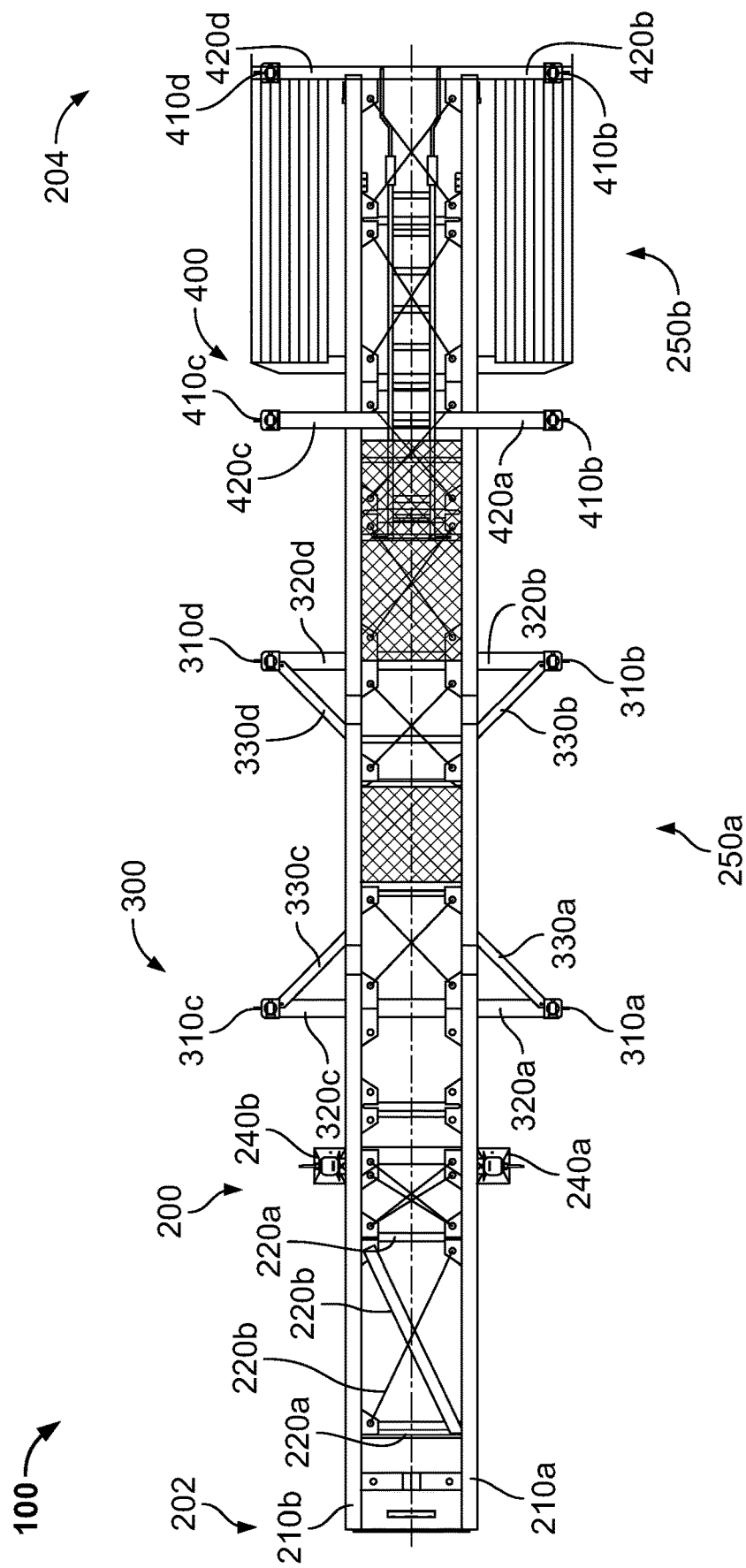
FIG. 1A is a top view of the bulk material shipping container trailer of one example embodiment of the present disclosure

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Bulk material shipping containers are often used to transport a wide range of products, parts, components, items, and materials such as, but not limited to, seeds, shavings, fasteners, and granular materials (such as sand). These are sometimes called loose materials or simply materials. To make use of and/or store these materials appropriately, the bulk material shipping containers must be transported from one location to another. In some cases, this transport can be done via train. However, in other cases such as for the "last mile" of transport, bulk material shipping containers may instead be transported over land via a trailer attached to a transport vehicle.

In some cases, it may be beneficial for materials to be unloaded directly from the bulk material shipping container while it is loaded on the trailer. To accomplish this, the present disclosure contemplates a trailer with a gate opening assembly that is configured to open a material unloading assembly of the container to allow material in the bulk material shipping container to be released from of a bottom of the container through the material unloading assembly of the bulk material shipping container. The gate opening assembly, however, when attached to a trailer, may increase a height at which the container sits when it is loaded on the trailer. This can cause issues with weight distribution, and impair movement of the trailer due to the heightened center of mass.

With these issues in mind, various embodiments of the present disclosure provide a trailer having a gate opening assembly, wherein the gate opening assembly does not increase a height at which the bulk material shipping container sits on the trailer. In various such embodiments, the trailer includes a cut-out or reduced height section, wherein the gate opening assembly is positioned and attached to engage the gate of the material unloading assembly of the bulk material shipping container. The height of the cut-out section is substantially similar to the height of the gate opening assembly. This enables the trailer to transport a bulk material shipping container, and unload the bulk material shipping container using the gate opening assembly, without requiring the bulk material shipping container to be removed from the trailer.

Referring specifically now to FIGS. 1A, 1B, 2, 3, 4, 5, 6, 7, 8, and 9, one example embodiment of the present disclosure is illustrated wherein the bulk material shipping container trailer is indicated by numeral 100.

In this illustrated example embodiment, the bulk material shipping container trailer 100 (referred to herein simply as the "trailer" for brevity) is configured to accommodate two bulk material shipping containers (not shown) such as the bulk material shipping container shown in U.S. Published Patent Application No. 2018/0002066. It should be appreciated, however, that the trailer 100 may alternatively be configured to accommodate only one bulk material shipping container. The trailer 100 shown in the FIGS. 1A to 9 includes container support assemblies for the two bulk material shipping containers, spaced apart such that a first full bulk material shipping container can be positioned in a center of the trailer 100, and a second empty bulk material shipping container can be positioned at a rear of the trailer 100.

The trailer 100 includes a base structure 200, a first container support assembly 300, a second container support assembly 400, and a gate opening assembly 500.

The base structure 200 includes a front end 202, a rear end 204, longitudinal members 210a and 210b, a plurality of lateral connection members 220a and 220b, wheelsets 230a and 230b, and front ground support members 240a and 240b.

The base structure 200 of the trailer 100 is configured to be removably attached to a transport vehicle (not shown) proximate the front end 202 in a conventional manner.

The longitudinal members 210a and 210b of the base structure 200 extend along a length of the trailer 100 from the front end 202 to the rear end 204. The longitudinal members 210a and 210b are generally parallel to each other when viewed from above, as shown in FIG. 1. The longitudinal members 210a and 210b are generally identical to each other, but with a reversed or mirrored orientation. The longitudinal members 210a and 210b include an upright curvature (i.e., the curvature occurs in a vertical or substantially vertical plane) proximate the front end 202. The curvature enables the connection to the transport vehicle to be higher than the container support assemblies, such that the bulk material shipping containers can be transported lower to the ground, thereby providing additional stability to the trailer 100. The longitudinal members 210a and 210b may be made from steel or any other suitably strong material or combination of materials, and may include portions that have an I-beam design, or any other appropriate configuration.

The longitudinal members 210a and 210b include two container support assembly connection sections 250a and 250b (referred to herein simply as "section 250a" and "section 250b" for brevity).

The first container support assembly connection section 250a of the base structure 200, shown in greater detail in FIGS. 2 to 9, includes a middle portion of the base structure 200, including middle portions of both the first and second longitudinal members 210a and 210b. The first longitudinal member 210a and second longitudinal member respectively include front flat portions 260a-b, front angled portions 262a-b, center flat portions 264a-b, rear angled portions 266a-b, and rear flat portions 268a-b. Section 250a is configured to connect to the first container support assembly 300, and to the gate opening assembly 500.

In various embodiments, one or more or all of the portions 260a-b, 262a-b, 266a-b, and 268a-b each include one or more reinforcing plates that provide strength to the longitudinal members 210a and 210b that would otherwise be present in longitudinal members without the first container support assembly connection section 250a. In effect, the reinforcing plates can replace the strength of the longitudinal members 210a and 210b that is lost due to the cutout structure of the first container support assembly connection section. It should be appreciated that other suitable reinforcing members may be employed in accordance with the present application.

The front flat portions 260a-b are connected respectively to lateral support arms 320a and 320c of the first container support assembly 300. The front flat portions 260a-b are also connected respectively to angled support arms 330a and 330c of the first container support assembly 300. The front flat portions 260a-b are also connected respectively to the front angled portions 262a-b of the first section 250a. The front flat portions 260a-b include a substantially horizontal top surface when the trailer 100 is positioned on a level surface.

The front angled portions 262a-b are connected respectively to the front flat portions 260a-b at respective first ends. The front angled portions 262a-b are also connected respectively to the center flat portions 264a-b at respective second ends. The front angled portions 262a-b are angled downward from a first end nearer the front end 202 of the trailer 100 toward a second end nearer the rear end 204 of the trailer 100, such that a connection to the front flat portions 260a-b is higher with respect to the ground than a connection to the center flat portions 264a-b.

The center flat portions 264a-b are connected respectively to the front angled portions 262a-b at respective first ends. The center flat portions 264a-b are also connected respectively to the rear angled portions 266a-b at respective second ends. The center flat portions 264a-b are also connected to the gate opening assembly 500, as discussed in further detail below and shown in FIGS. 4 to 9. A length of the center flat portions 264*a-b* is based on a size of the gate opening assembly 500, such that the gate opening assembly 500 is positionable on the center flat portions 264*a-b* between the front angled portions 262*a-b* and the rear angled portions 266*a-b* as shown in FIGS. 4 to 9. In addition, a difference in height between the center flat portions 264*a-b* and the front and/or rear flat portions 260*a-b* and 268*a-b* is based on a height of the gate opening assembly 500. The difference in height is configured to enable the gate opening assembly 500 to fit on top of the center flat portions 264*a-b*, and have a top that is at or below the corner nesting supports 310*a-d* of the first container support assembly 300. This sizing enables a container to be loaded on to the container support assembly 300 with the gate opening assembly 500 positioned below the container, such that the gate opening assembly can be used to unload the contents of the container from a bottom of the container.

The rear angled portions 266*a-b* are connected respectively to the center flat portions 264*a-b* at respective first ends. The rear angled portions 266*a-b* are also connected respectively to the rear flat portions 268*a-b* at respective second ends. The rear angled portions 266*a-b* are angled upward from a first end nearer the front end 202 of the trailer 100 toward a second end nearer the rear end 204 of the trailer 100, such that a connection to the center flat portions 264*a-b* is lower with respect to the ground than a connection to the rear flat portions 268*a-b*. In the embodiment shown in the Figs., the angle and length of the rear angled portions 266*a-b* is the same as the angle and length of the front angled portions 262*a-b* (i.e., the front angled portions 262*a-b* mirror the rear angled portions 266*a-b*). It should be appreciated, however, that the front angled portions 262*a-b* may have a different length and/or angle than the rear angled portion 266*a-b* (i.e., the front and rear angled portions may be asymmetric). Where the front and rear angled portions are do not mirror each other, a height difference between the front/rear flat portions and the center flat portions may still be the same.

The rear flat portions 268*a-b* are connected respectively to lateral support arms 320*b* and 320*d* of the first container support assembly 300. The rear flat portions 268*a-b* are also connected respectively to angled support arms 330*b* and 330*d* of the first container support assembly 300. The rear flat portions 268*a-b* are also connected respectively to the rear angled portions 266*a-b* of the first section 250*a*. The rear flat portions 268*a-b* include a substantially horizontal top surface when the trailer 100 is positioned on a level surface.

The second container support assembly connection section 250*b* of the base structure 200 comprises a rear portion of the base structure 200, including rear portions of both the first and second longitudinal members 210*a* and 210*b*. The second section 250*b* is configured to connect to the second container support assembly 400.

The plurality of lateral connection members 220*a* and 220*b* include members that extend between and are connected to both longitudinal members 210*a* and 210*b*. The lateral connection members 220*a* extend transversely (such as perpendicularly) to a longitudinal axis of the longitudinal members 210*a* and 210*b*. The lateral connection members 220*b* extend at a non-perpendicular angle with respect to the longitudinal axis of the longitudinal members 210*a* and 210*b*.

The wheelsets 230*a* and 230*b* include corresponding axles, bearings, wheels, and other appropriate wheelset components (not shown or individually labeled).

The front ground support members 240*a* and 240*b* are each configured to transition from a stowed position to a ground engaging position. Each front ground support member 240*a* and 240*b* is extendable toward the ground, so as to enable the trailer 100 (and/or portions of the trailer 100) to be level with respect to the ground, particularly when the trailer 100 is not attached to a transport vehicle. The front ground support members 240*a* and 240*b* also assist in transitioning the trailer from being attached to a transport vehicle to being unattached, and vice versa.

The first container support assembly 300 is positioned near the middle to optimize the strength of the trailer 100, attached to the first section 250*a* between the front end 202 and the rear end 204 of the base structure 200. The first container support assembly 300 is configured to support a full bulk material shipping container. In some cases, the full bulk material shipping container weighs approximately 50,000 lbs.

The first container support assembly 300 includes first, second, third, and fourth corner nesting supports 310*a*, 310*b*, 310*c*, and 310*d*; first, second, third, and fourth lateral support arms 320*a*, 320*b*, 320*c*, and 320*d*; and first, second, third, and fourth angled support arms 330*a*, 330*b*, 330*c*, and 330*d*.

The first, second, third, and fourth corner nesting supports 310*a-d* are each configured to engage and assist in correctly aligning the first bulk material shipping container on the trailer 100. The corner nesting supports 310*a-d* are spaced apart from each other (via connections to the lateral support arms 320*a-d* and angled support arms 330*a-d*) such that they are configured to engage the bottom corners of a standard sized bulk material shipping container such as the bulk material shipping container shown in U.S. Published Patent Application No. 2018/0002066. The corner nesting supports 310*a-d* are illustrated as all having a similar or identical height with respect to ground. This enables the corner nesting supports 310*a-d* to provide level support to the container, where the container has a flat bottom surface, or where the bottom corners of the container all share the same height with respect to ground when the container is level.

However, it should be appreciated that some containers may have a non-horizontal bottom surface, wherein one or more bottom corners of the container are not at the same height as one or more other bottom corners. For instance, a container may have an angled or sloping bottom surface, wherein two of the four bottom corners are at a higher level than the other two. In this instance, two of the four corner nesting supports 310*a-d* may extend upward further than the other two, matching the height difference in the bottom corners of the container. Other orientations and arrangements may be used as well, wherein one or more of the corner nesting supports 310*a-d* are at a different height than one or more other of the corner nesting supports, configured to match an arrangement of a container.

It should also be appreciated that the corner nesting supports 310*a-d* are substantially similar in the illustrated example embodiment. Thus, for brevity, only the corner nesting support 310*a* is further described in detail.

Figure 2:
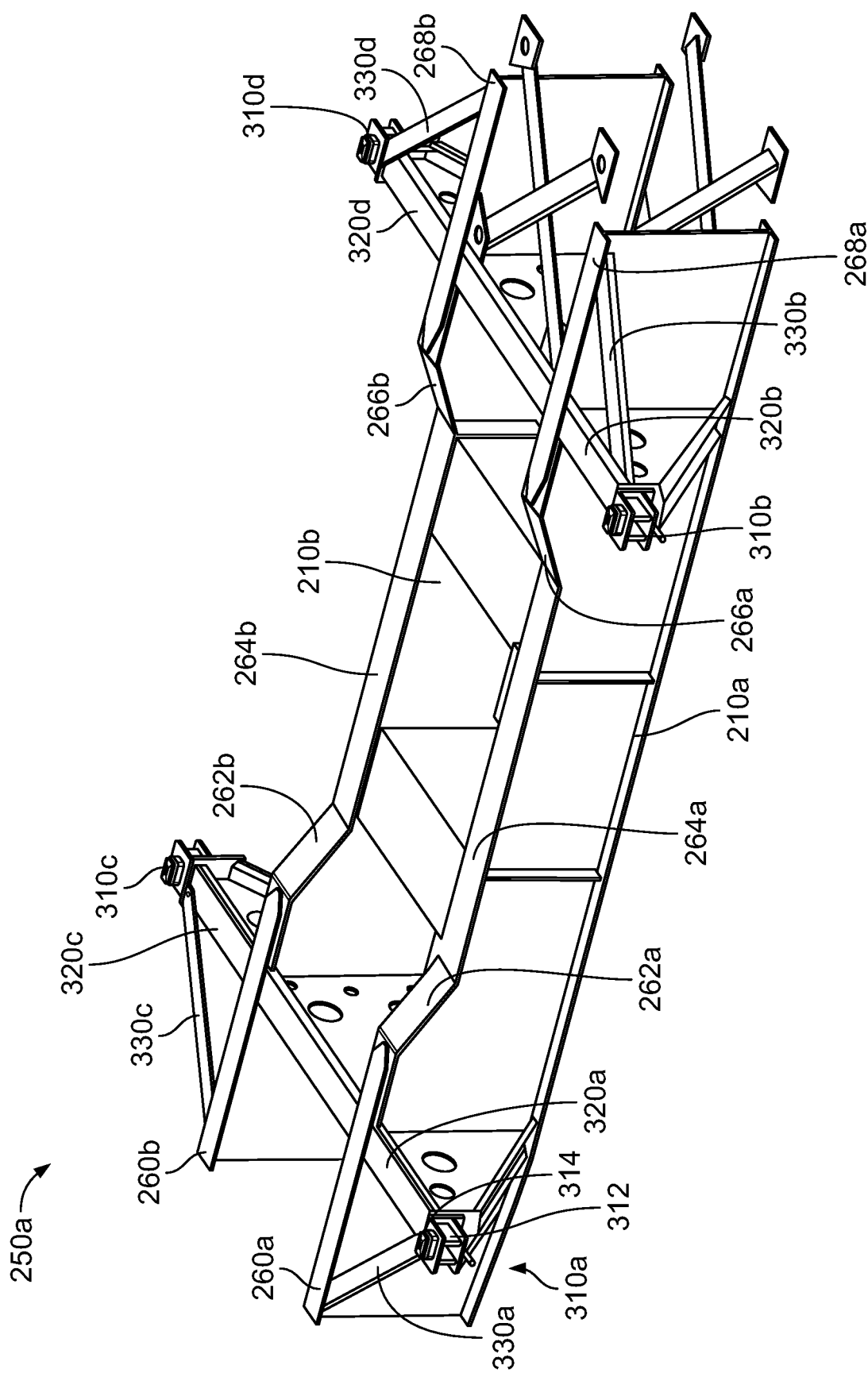
FIG. 2 is a top perspective view of the container support assembly connection section of the base structure of the trailer of FIGS. 1A and 1B.
Figure 3:
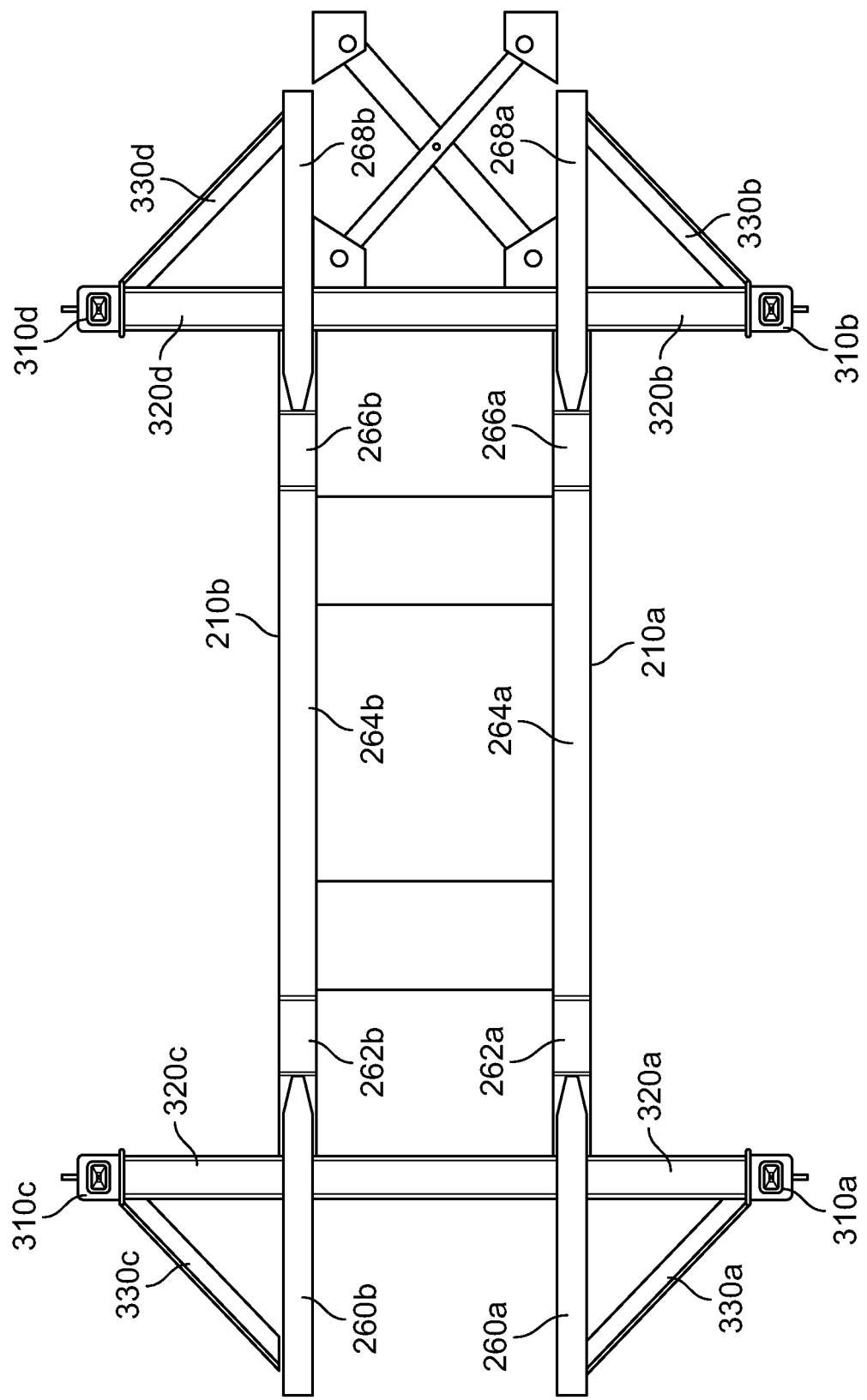
FIG. 3 is a top view of a container support assembly connection section of the base structure of the trailer of FIGS. 1A and 1B.
Figure 4:
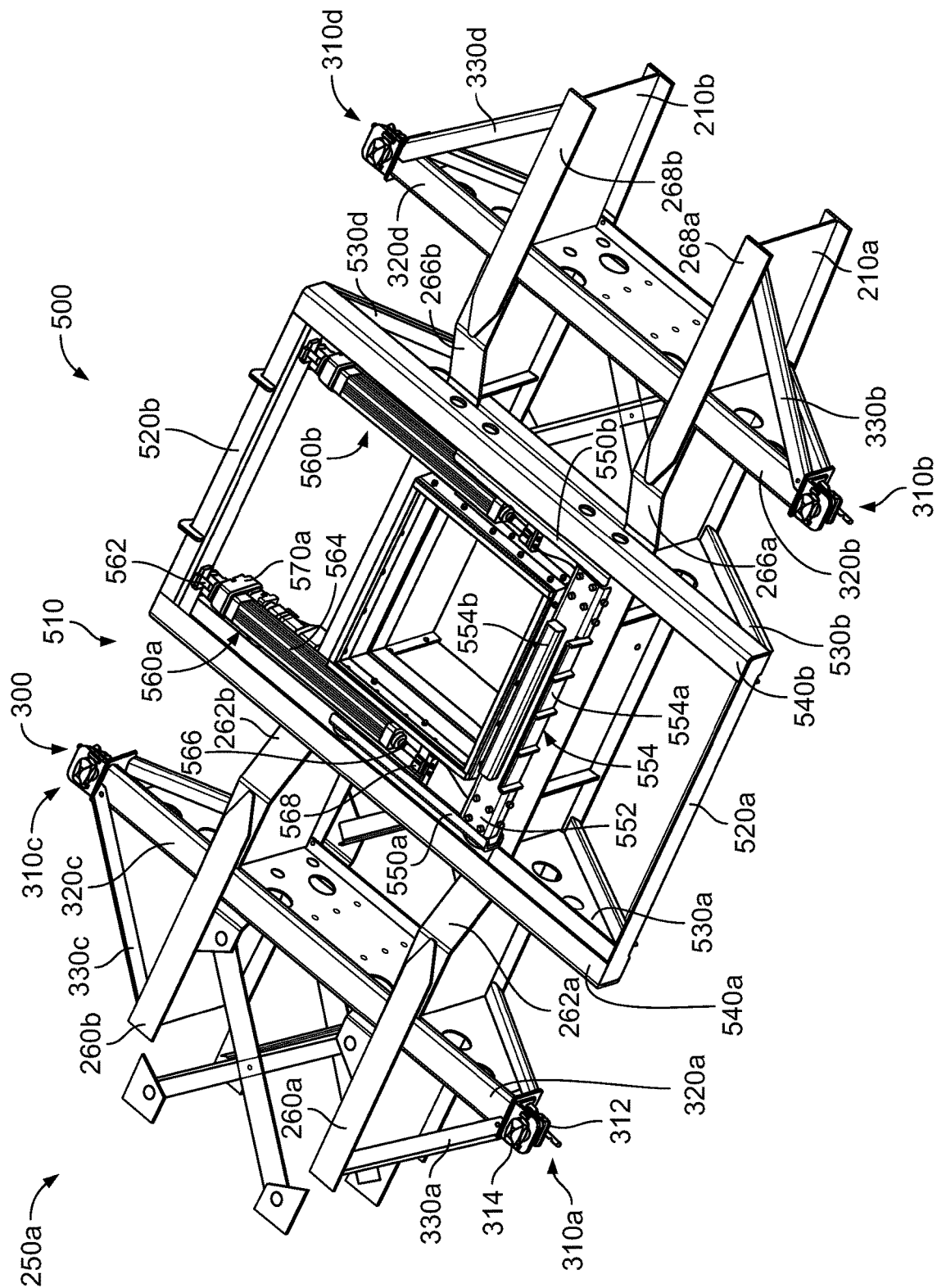
FIG. 4 is a top perspective view of the container support assembly connection section of FIGS. 2 and 3 of the trailer of FIGS. 1A and 1B, showing the gate opening assembly.
Figure 5:
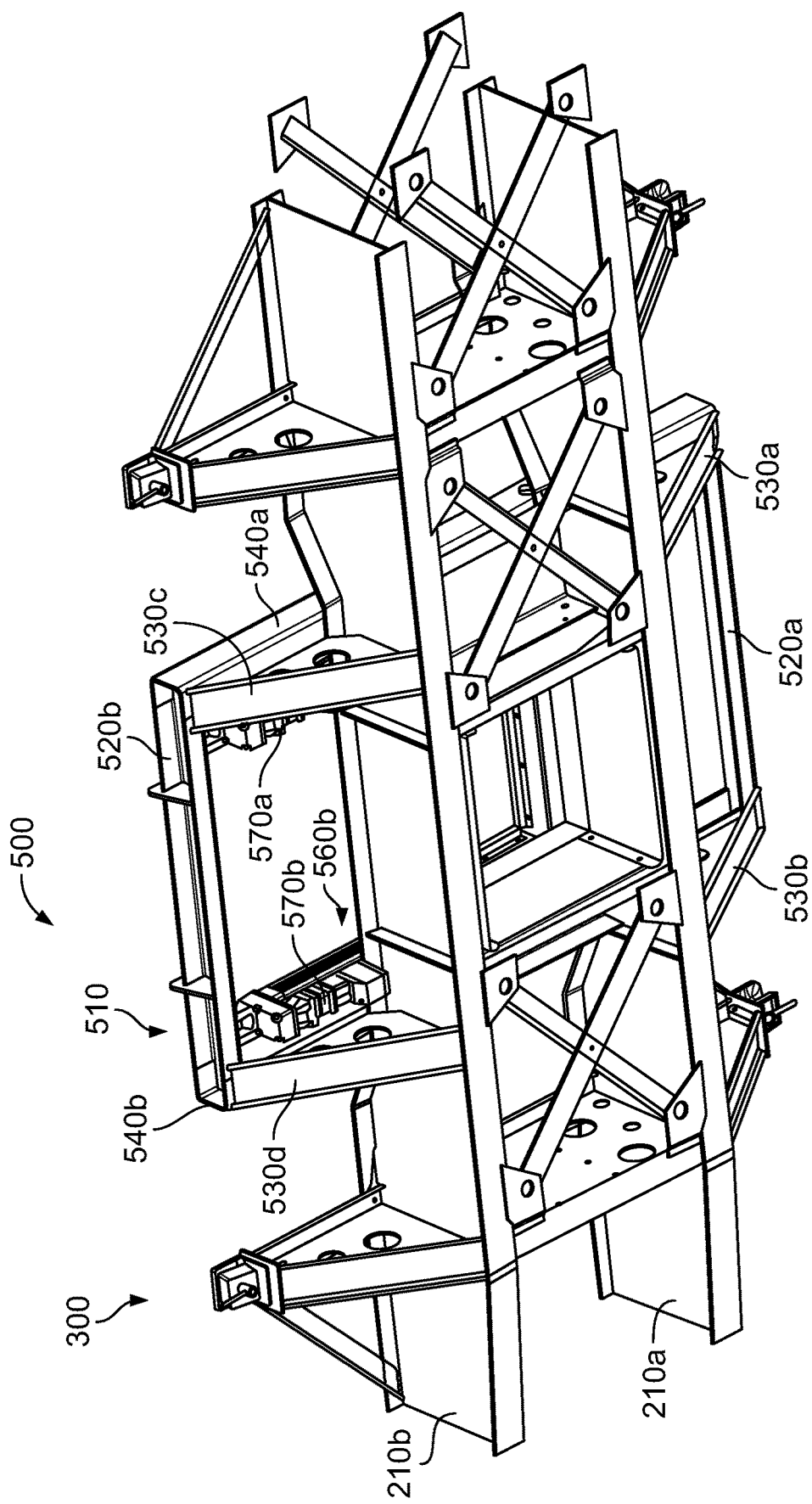
FIG. 5 is a bottom perspective view of the container support assembly connection section of FIGS. 2 and 3 of the trailer of FIGS. 1A and 1B, showing the gate opening assembly.

Specifically, as shown in FIGS. 2 and 4, the corner nesting support 310*a* includes a base 312 and a container engagement member 314. The base 312 is connected on a first side and/or bottom end to the lateral support arm 320*a* and/or the angled support arm 330*a*. The container engagement member 314 is connected to a top of the base 312, and is configured to engage and lock to a bottom corner of a bulk material shipping container (not shown). The container engagement member 314 may have a tubular shape, an elongated triangular shape, or any other suitable shape. The container engagement member 314 may be solid. The container engagement member 314 extends upwardly from the base 312. The base 312 and/or container engagement member 314 may be made from steel or any other suitably strong material.

The first, second, third, and fourth lateral support arms 320*a-d* are each configured to provide lateral and vertical support to the corner nesting supports 310*a-d*, and thus to support a bulk material shipping container positioned on the corner nesting supports 310*a-d*. It should be appreciated that the lateral support arms 320*a-d* are substantially similar to each other in the illustrated example embodiment. Thus, for brevity, only the lateral support arm 320*a* is further described in detail.

Figure 1B:
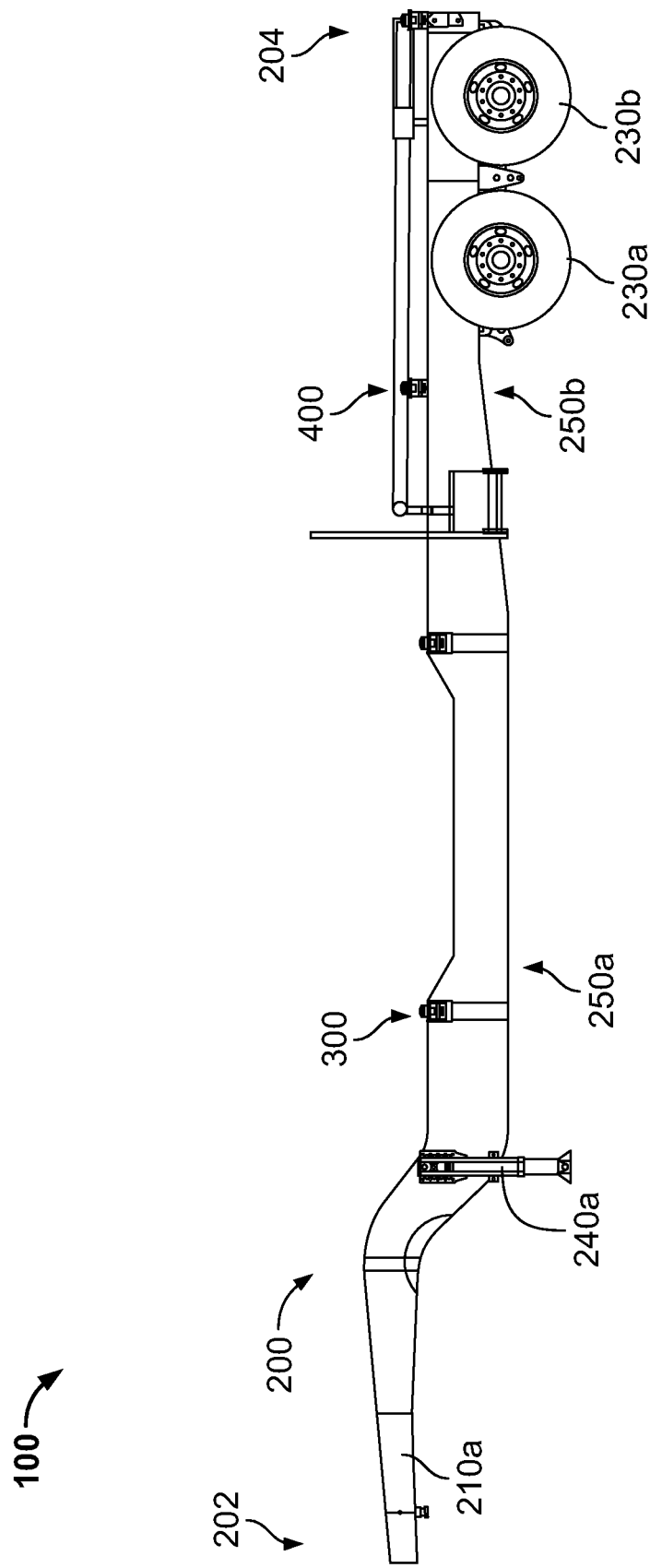
FIG. 1B is a side view of the bulk material shipping container trailer of FIG. 1A.

The lateral support arm 320*a* extends laterally outward from the base 200 with respect to the longitudinal axis of the longitudinal members 210*a* and 210*b*. On a first end, the lateral support arm 320*a* is connected to the first corner nesting support 310*a*. On a second end opposite the first end, the lateral support arm is connected to the first longitudinal member 210*a*. Alternatively, lateral support arms 320*a* and 320*c* may be integrally formed with each other (e.g., a single arm), such that the combined lateral arm is connected to the first corner nesting support 310*a* at a first end, and to the third corner nesting support 310*c* at a second end. The combined lateral arm is then connected to the first and second longitudinal members 210*a* and 210*b* near the middle of the combined arm as shown in FIGS. 1A and 1B. The lateral support arm 320*a* may be connected to the longitudinal member 210*a* by welding, one or more fasteners, and/or any other suitable connection mechanism(s).

The lateral support arm 320*a* has a substantially horizontal top side as shown best in FIGS. 2 and 4, such that a top of the lateral support arm 320*a* is flush or substantially similar in height to a top of the longitudinal member 210*a* (and in particular, to the front flat portion 260*a*). It should be appreciated that alternative embodiments may include the lateral support arm 320*a* being connected at an angle with respect to the longitudinal member 210*a*, such that a connection to the longitudinal member 210*a* is lower than a connection to the first corner nesting support 310*a*. In addition, the lateral support arm 320*a* is shown as having a tapered or triangular shape, shown best in FIGS. 2 and 4. It should be appreciated that alternative shapes and orientations may be used as well or instead. The lateral support arm 320*a* is configured (in combination with the other lateral support arms 320*b-d*) to support the weight of a full bulk material shipping container (e.g., such as up to 50,000 lbs or more) without breaking.

The first, second, third, and fourth angled support arms 330*a-d* are each configured to provide primarily lateral support to the lateral support arms 320*a-d* and corner nesting supports 310*a-d*. The angled support arms 330*a-d* are configured to prevent forward and backward movement of the bulk material shipping container when positioned on the first container support assembly 300. It should be appreciated that the angled support arms 330*a-d* are substantially similar in the illustrated example embodiment. Thus, for brevity, only the angled support arm 330*a* is further described in detail.

The angled support arm 330*a* extends outward from the first longitudinal member 210*a* at an angle with respect to the longitudinal axis of the longitudinal members 210*a* and 210*b*. On a first end, the angled support arm 330*a* is connected to the first corner nesting support 310*a* and/or the first lateral support arm 320*a*. On a second end opposite the first end, the angled support arm is connected to the first longitudinal member 210*a*. The angled support arm 330*a* may be connected to the longitudinal member 210*a*, the lateral support arm 320*a*, and/or the first corner nesting support 310*a* by welding, one or more fasteners, or any other suitable connection mechanism.

The angled support arm 330*a* extends from the first longitudinal member 210*a* at a position near or proximate the front end 202 of the trailer 100 with respect to the connection between the first longitudinal member 210*a* and the first lateral support arm 320*a* (i.e., the angled support arm 330*a* is forward with respect to the lateral support arm 320*a*). As shown best in FIGS. 2 and 3, the first angled support arm 330*a* is a front support arm (as opposed to angled support arm 330*b*, which is a rear support arm). As such, the first angled support arm 330*a* connects to the first longitudinal member 210*a* at a position more forward relative to the connection position for the corresponding lateral support arm 320*a*. In contrast, the second angled support arm 330*b* connects to the first longitudinal member 210*a* at a position more rearward relative to the connection position for the corresponding lateral support arm 320*b*. This orientation provides support, while minimizing interference with the positioning and operation of the gate opening assembly 500 when connected to the trailer 100. However, it should be appreciated that an opposite orientation may be used as well, wherein the angled support arms are positioned on the opposite side of the lateral support arms than how they are described above.

The angled support arm 330*a* is substantially horizontal as shown in the embodiment of FIGS. 1 and 2, such that a top of the angled support arm 330*a* is flush or substantially the same height as a top of the longitudinal member 210*a* (in particular, the front flat portion 260*a*). It should be appreciated that alternative embodiments may include the angled support arm 330*a* being connected at an upright angle with respect to the longitudinal member 210*a*, such that a connection to the longitudinal member 210*a* is lower or higher than a connection to the first corner nesting support 310*a* and/or lateral support arm 320*a*. The angled support arm 330*a* is configured to reduce forward and/or backward flexing or movement of the lateral support arm 320*a*.

The second container support assembly 400 is positioned above the wheelsets 230*a* and 230*b* of the base structure 200, and is attached to the second section 250*b* of the base structure proximate the rear end 204 of the trailer 100. The second container support assembly 400 includes first, second, third, and fourth corner nesting supports 410*a*, 410*b*, 410*c*, and 410*d*, and first, second, third, and fourth lateral support arms 420*a*, 420*b*, 420*c*, and 420*d*.

The first, second, third, and fourth corner nesting supports 410*a-d* may be similar or identical to corner nesting supports 310*a-d* described above. The corner nesting supports 410*a-d* are each configured to engage and assist in correctly aligning a second bulk material shipping container on the trailer 100. The corner nesting supports 410*a-d* are spaced apart from each other (via connections to the lateral support arms 420*a-d*) such that they are configured to engage the bottom corners of a standard sized bulk material shipping container such as the bulk material shipping container shown in U.S. Published Patent Application No. 2018/0002066.

The first, second, third, and fourth lateral support arms 420*a-d* are each configured to provide lateral and vertical support to the corner nesting supports 410*a-d*, and thus to support a bulk material shipping container positioned on the corner nesting supports 410*a-d*. It should be appreciated that the lateral support arms 420*a-d* are substantially similar to each other in the illustrated example embodiment. Further, the lateral support arms 420a-d may be substantially similar or identical to lateral support arms 320a-d described above.

In this illustrated example embodiment, the second container support assembly 400 does not include the angled support arms that are included in the first container support assembly (e.g., angled support arms 330a-d). It should be appreciated, however, that in some embodiments the second container support assembly 400 may include angled support arms that are similar or identical to the angled support arms 330a-d described with respect to container support assembly 300.

The gate opening assembly 500 is configured to cause a gate assembly (not shown) of a material unloading assembly of a bulk material shipping container positioned on the first container support assembly 300, and particularly a gate closure member (not shown) of the gate assembly, to open partially, open fully, and thereafter close. This process is described in more detail below.

Referring now to FIGS. 4 to 9, in this illustrated embodiment the gate opening assembly 500 includes: (a) a bulk material shipping container gate mover 510; (b) first and second side braces 520a, and 520b: and (c) first, second, third, and fourth lateral gate opening assembly support members 530a-d.

The bulk material shipping container gate mover 510 includes: (a) a track assembly 512 integrally connected to an supported by the base structure 200: and (b) a gate mover assembly 514 supported by the track assembly 512 and configured to receive and engage a downwardly extending handle or engagement member (not shown) of a gate of a gate opening assembly of a bulk material shipping container.

More specifically, the track assembly 512 includes: (a) a first track 540a integrally connected to and supported by the first and second longitudinal members 210a and 210b, and specifically supported by the central flat portions 264a and 264b; and (b) a second track 540b spaced apart from the first track 540a and integrally connected to and supported by the first and second longitudinal members 210a and 210b, and specifically supported by the central flat portions 264a and 264b. The first track 540a and the second track 540b are each configured to enable components of the gate mover assembly 514 to be movable along the first track 540a and the second track 540b. It should be appreciated that the first track 540a and the second track 540b are substantially similar or substantially mirror images of each other in this illustrated example embodiment. Thus, for brevity, only the first track 540a is further described in more detail.

Figure 8:
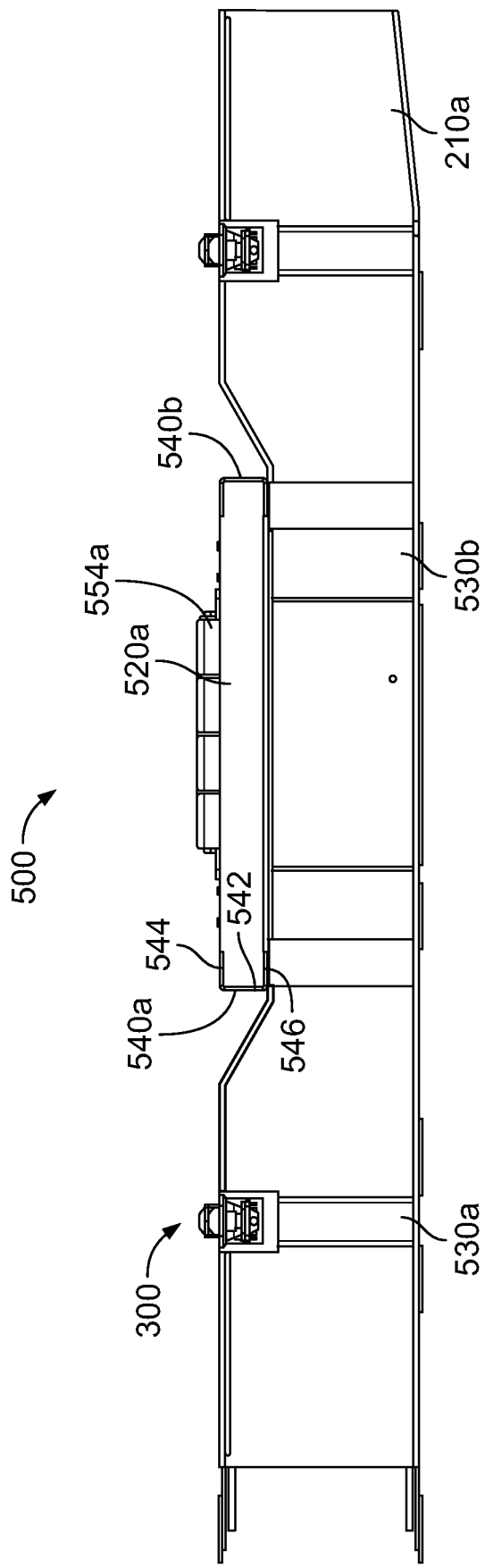
FIG. 8 is a first side view of the container support assembly connection section of FIGS. 2 and 3 of the trailer of FIGS. 1A and 1B, showing the gate opening assembly.
Figure 9:
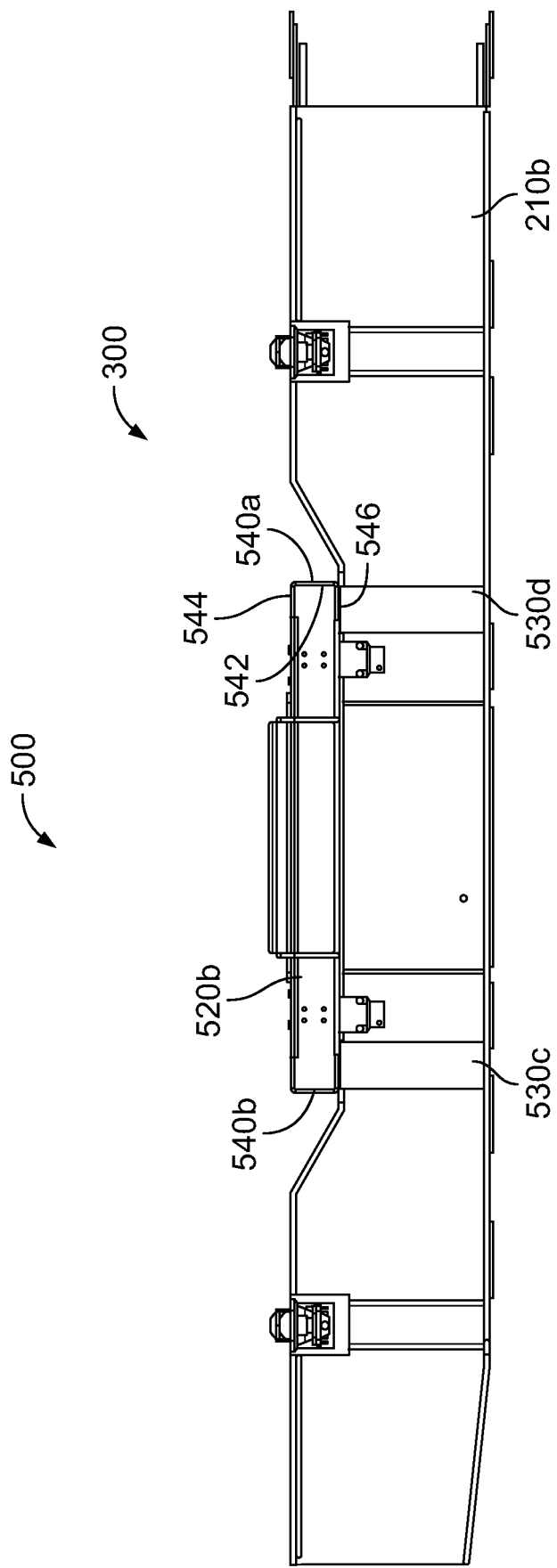
FIG. 9 is a second side view of the container support assembly connection section of FIGS. 2 and 3 of the trailer of FIGS. 1A and 1B, showing the gate opening assembly.

As best shown in FIGS. 8 and 9, the first track 540a includes a C-shaped bracket. The bracket includes: (a) an elongated horizontally extending first upright wall 542; (b) an upper wall 544 integrally connected to and extending horizontally inwardly from the first wall; and (c) a lower wall 546 spaced apart from the upper wall 544 and integrally connected to and extending horizontally inwardly from the first wall 542. In this illustrated embodiment, the lower wall 546 is integrally connected to the center flat portion 264a of the first longitudinal member 210a, and to the center flat portion 264b of the second longitudinal member 210b.

The second track 540b mirrors the first track 540a, having a reversed orientation as illustrated best in FIGS. 8 and 9.

The gate mover assembly 514 includes: (a) a first trolley 550a; (b) a second trolley 550b spaced apart from the first trolley 550a; (c) a trolley connector 552 connected to the first trolley 550a and the second trolley 550b; (d) a gate receiver and engager assembly 554 integrally connected to and supported by the trolley connector 552; (e) a first trolley mover assembly 560a connected to the first trolley 550a; (f) a second trolley mover assembly 560b connected to the second trolley 550b; (g) a first trolley mover assembly controller 570a fluidly connected to the first trolley mover assembly 560a; and (h) a second trolley mover assembly controller 570b fluidly connected to the second trolley mover assembly 560b.

The first trolley 550a and the second trolley 550b are configured to move along the first track 540a and the second track 540b, respectively. It should be appreciated that first trolley 550a and the second trolley 550b are substantially similar in this illustrated example embodiment. Thus, for brevity, only the first trolley 550a is further described in more detail.

The first trolley 550a includes: (a) a C-shaped bracket; (b) a first wheel rotatably connected to the C-shaped bracket; and (c) a second spaced apart from the first wheel and rotatably connected to the C-shaped bracket. The first wheel and the second wheel are configured to be movable along the first track 540a, and thus enable the first trolley 550a to be movable along the first track 540a. The first wheel is configured to rotate about a first horizontal axis. The second wheel is configured to rotate about a second different horizontal axis. The first trolley may also include: (d) a third wheel, configured to rotate about a vertical or upright axis. The third wheel may be configured to prevent the first trolley 550a from moving tangentially or substantially tangentially to the first track 540a when moving along the first track 540a. Since the first wheel, the second wheel, and the third wheel are each configured to be movable along the first track 540a, the first horizontal axis about which the first wheel rotates, the second horizontal axis about which the second wheel rotates, and the first vertical axis about which the third wheel rotates are each movable along or relative to the first track 540a. The first, second, and/or third wheels are flange type wheels in this example embodiment, similar to a rail car wheel, which enable proper movement within the tracks.

The first wheel includes a body that defines a fastener opening configured to receive a suitable fastener. The first wheel is connected to the C-Shaped bracket of the first trolley 550a by inserting and securing a suitable fastener through the fastener opening defined by the body of the first wheel and further through the fastener opening defined by the C-Shaped wall.

The second wheel includes a body that defines a fastener opening configured to receive a suitable fastener. The second wheel is connected to the C-Shaped bracket of the first trolley 550a by inserting and securing a suitable fastener through the fastener opening defined by the body of the second wheel and further through the fastener opening defined by the C-Shaped wall.

The third wheel includes a body that defines a fastener opening configured to receive a suitable fastener. The third wheel is connected to C-Shaped bracket of the first trolley 550a by inserting and securing a suitable fastener through the fastener opening defined by the body of the third wheel and further through the fastener opening defined by the C-Shaped wall.

Figure 6:
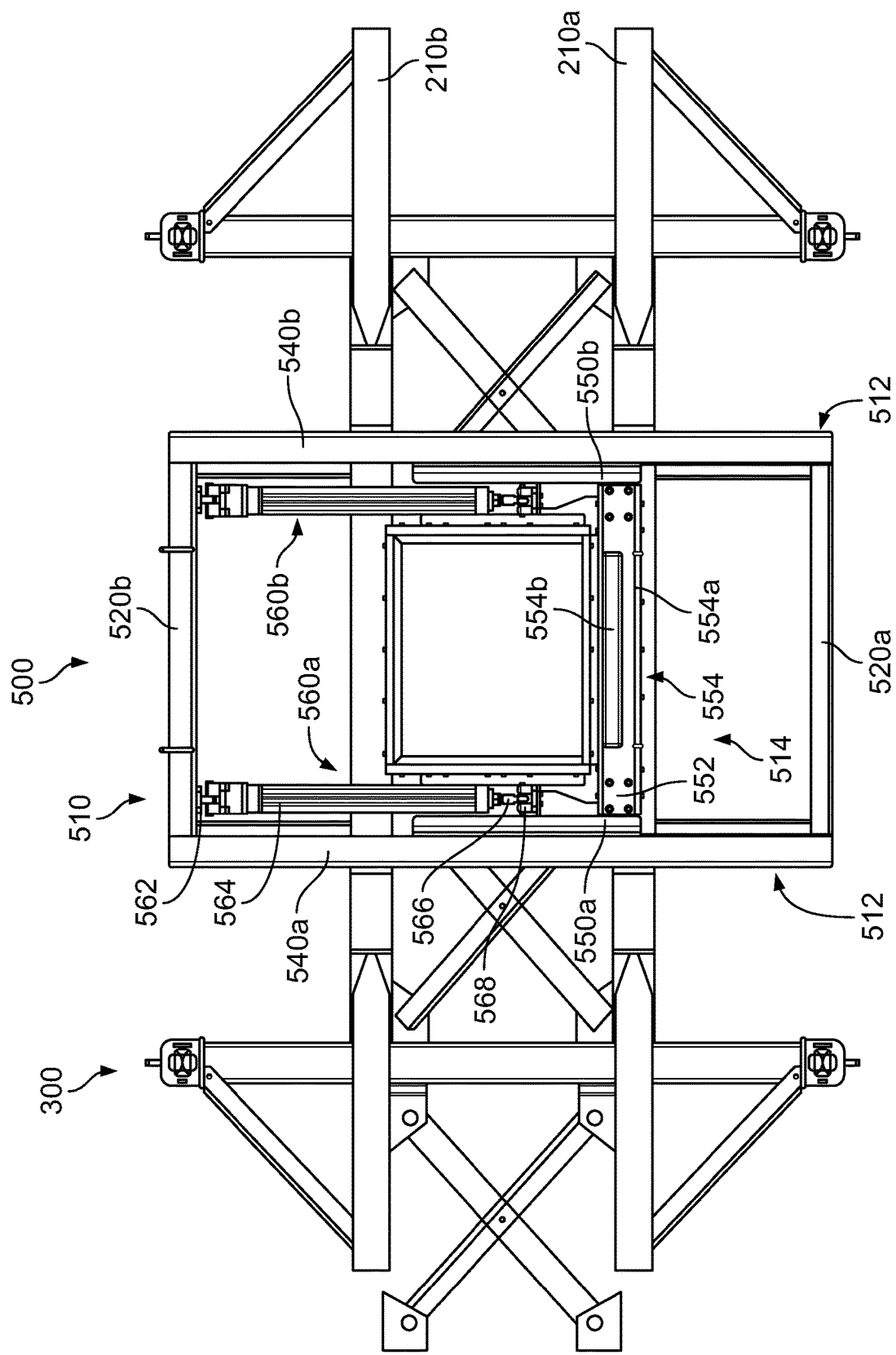
FIG. 6 is a top view of the container support assembly connection section of FIGS. 2 and 3 of the trailer of FIGS. 1A and 1B, showing the gate opening assembly.
Figure 7:
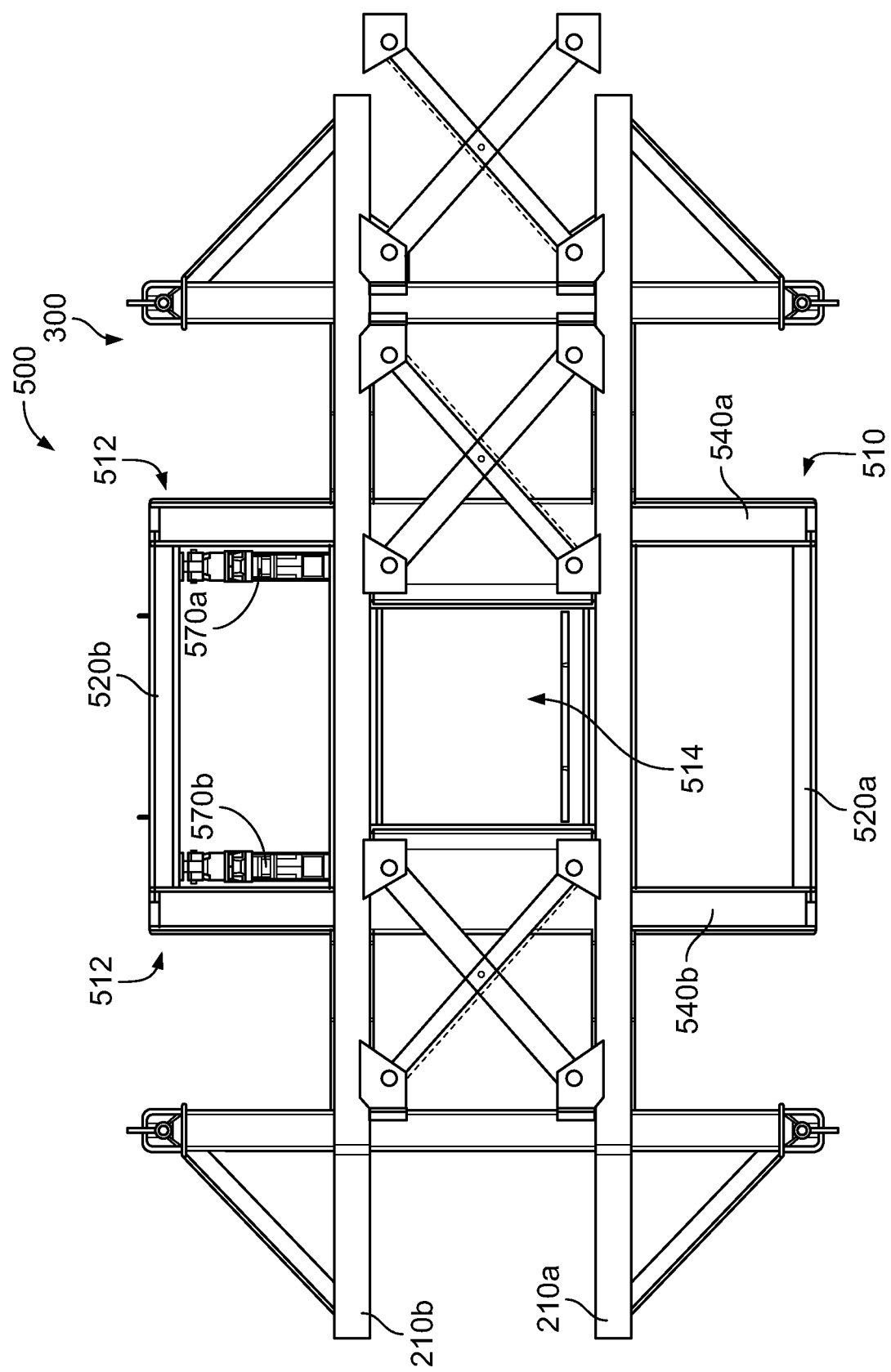
FIG. 7 is a bottom view of the container support assembly connection section of FIGS. 2 and 3 of the trailer of FIGS. 1A and 1B, showing the gate opening assembly.

The trolley connector 552 connects the first trolley 550a to the second trolley 550b, as best shown in FIGS. 4 and 6.

The trolley connector 552 includes a reinforced or gusseted C-shaped bracket. The bracket includes: (a) a horizontally extending planar wall that includes a body that defines a plurality of fastener openings; (b) a first vertically extending wall integrally connected to and extending downwardly from the horizontally extending wall, wherein the first vertically extending wall includes a body that defines a plurality of fastener openings; and (c) a second vertically extending wall integrally connected to and extending downwardly from the horizontally extending wall, wherein the second vertically extending wall includes a body that defines a plurality of fastener openings.

The fastener openings defined by the bodies of the walls of the trolley connector 552 are each configured to connect one end of the trolley connector 552 to the first trolley 550*a* and connect an opposing end of the trolley connector 552 to the second trolley 550*b*.

The gate receiver and engager assembly 554 is configured to receive and engage a downwardly extending handle or engagement member of the gate or closure member of a container positioned on the first container support assembly 300 (not shown).

The gate receiver and engager assembly 554 includes two spaced apart upwardly extending hands 554*a* and 554*b*. The gate receiver and engager assembly 554 can further include additional different and separately spaced apart upwardly extending locking engager hands (not shown). The two spaced apart upwardly extending hands 554*a* and 554*b* are each configured to receive and engage the downwardly extending handle of the gate.

More specifically, the upwardly extending hand 554*a* is configured to engage a front side of the downwardly extending handle of the gate. Thus, when the first trolley 550*a* and the second trolley 550*b* move along the first track 540*a* and the second track 540*b*, respectively, the upwardly extending hand 554*a* engages an outwardly facing surface of the downwardly extending handle of the gate to partially open the gate, and thereafter fully open the gate. This enables loose materials in the container to exit the container and travel through the gate opening assembly 500. Further, the upwardly extending hand 554*b* is configured to engage a rear side of the downwardly extending handle of the gate. Thus, when the first trolley 550*a* and the second trolley 550*b* move along the first track 540*a* and the second track 540*b*, respectively, in an opposite direction to the direction which causes an opening of the gate, the upwardly extending hand 554*b* engages an inwardly facing surface of the downwardly extending handle of the gate to partially close the gate, and thereafter fully close the gate.

It should be appreciated that the movement of the first trolley 550*a* and the second trolley 550*b* along the first track 540*a* and the second track 540*b*, respectively, can be controlled by the trolley mover assembly controllers 570*a* and 570*b* (as further described below). For example, the controllers can be independently powered electric over hydraulic units, or hydraulic cylinders powered by a central 12-volt electric over hydraulic or diesel motor. Thus, the gate mover assembly 514 can control the rate or speed and how far the gate of the container should be opened or closed. Therefore, the gate mover assembly 514 can partially control the rate or speed at which loose materials exit the gate of the container and through the gate opening assembly 500.

The first trolley mover assembly 560*a* and the second trolley mover assembly 560*b* are respectively configured to cause the first trolley 550*a* and the second trolley 550*b* to move along the first track 540*a* and the second track 540*b*, respectively. It should be appreciated that first trolley mover assembly 560*a* and the second trolley mover assembly 560*b* are substantially similar or substantially mirror images of each other in this illustrated example embodiment. Thus, for brevity, only the first trolley mover assembly 560*a* is further described below.

The first trolley mover 560*a* includes: (a) a first housing bracket 562 integrally connected to and supported by the second side brace 520*b*; (b) a first hydraulic piston housing 564 integrally connected to the first housing bracket 562; (c) a first hydraulic piston 566 movable in the first hydraulic piston housing 564; and (d) a first trolley connector bracket 568 integrally connected to the first hydraulic piston 566.

More specifically, the first housing bracket 562 connects to the second side brace 520*b* and to the first hydraulic piston housing 564, as shown best in FIGS. 4 and 6.

The first hydraulic piston housing 564 is configured to receive the first hydraulic piston 566. The first hydraulic piston housing 564 includes a body that has an outer cylindrical surface and an inner cylindrical surface. The inner surface defines a chamber configured to receive the first hydraulic piston 566 and enable the first hydraulic piston 566 to be movable. The first hydraulic piston housing 564 further includes four spaced apart horizontally extending housing support rods (not labeled).

The first hydraulic piston 566 is configured to be movable in the first hydraulic piston housing 564 to cause the first trolley 550*a* to move along the first track 540*a*.

The first trolley connector bracket 568 is configured to connect the first hydraulic piston 566 to the first trolley 550*a*.

In this illustrated example embodiment, the first hydraulic piston 566 and a second hydraulic piston of the second trolley mover assembly 560*b* are individually controlled by respective trolley mover assembly controllers 570*a* and 570*b*. However it should be appreciated that a single controller may instead simultaneously control both mover assemblies, and/or the controllers 570*a* and 570*b* may co-act or operate together to simultaneously move the first and second trolleys 550*a* and 550*b* respectively along the first and second tracks 540*a* and 540*b*. This enables the gate mover assembly 514 to control how far to open or close the gate of the container. This also enables the gate mover assembly 514 to control the rate or speed at which loose materials exits the gate of the material unloading assembly of the container and through the gate opening assembly 500.

It should be appreciated that first trolley mover assembly controller 570*a* and the second trolley mover assembly controller 570*b* are substantially similar or substantially mirror images of each other in this illustrated example embodiment. Thus, for brevity, only the first trolley mover assembly controller 570*a* is further described below.

The first trolley mover assembly controller 570*a* is configured to control the first trolley mover assembly 560*a*. The first trolley mover assembly controller 570*a* is supported by a trolley mover assembly housing. The first trolley mover assembly housing is integrally connected to and extends between the second side brace 520*b* and the second longitudinal member 210*b*, as shown best in FIGS. 4, 5, and 7. The first trolley mover assembly housing is connected on a first side to the first housing bracket 562 of the first trolley mover 560*a*, and on a second side to the second longitudinal member 210*b*.

In this illustrated example embodiment, the first trolley mover assembly controller 570*a* is connected to and supported by the first housing base bracket 562 and the second longitudinal member 210*b* via suitable fasteners. Additionally, in this illustrated example embodiment, the first trolley mover assembly controller housing is configured to support a heater (not shown), which can be adjacent to the trolley mover assembly controller 570*a* and configured to provide heat to the trolley mover assembly controller 570*a*. More specifically, the heater can provide heat to the trolley mover assembly controller 570*a* so that hydraulic fluid of the trolley mover assembly controller 570*a* can be maintained in a fluidized state (regardless of relatively cold temperatures) to move suitably through various channels, ports, etc. to cause the first trolley mover assembly 560a to move the first trolley 550a along the first track 540a.

It should be appreciated that in this illustrated example embodiment, the components of the track assembly 512 are made of a suitable material, such as steel. It should further be appreciated that the first trolley 550a and the second trolley 550b (except the first, second, and third wheels of each trolley) are made of a suitable material, such as steel. It should further be appreciated that the first, second, and third wheels of the first trolley 550a and second trolley 550b are made of a suitable material, such as a plastic or rubber. It should further be appreciated that the trolley connector 552; the gate receiver and engager assembly 554; the brackets of the first and second trolley movers 560a and 560b; and the trolley mover assembly controller housings of the trolley mover assembly controllers 570a and 570b are each made of a suitable material, such as steel.

The first side brace 520a is connected to the first track 540a at a first end, and to the second track 540b at a second end. The first side brace provides stability to the track assembly 512.

The second side brace 520b is connected to the first track 540a at a first end, and to the second track 540b at a second end. The second brace provides stability to the track assembly 512. The second side brace 520b is also connected to the first housing bracket 562 of the first trolley mover 560a, and to a corresponding second housing bracket of the second trolley mover 560b.

The first, second, third, and fourth lateral gate opening assembly support members 530a-d are connected to and extend outwardly from the first and second longitudinal members 210a and 210b. The first, second, third, and fourth lateral gate opening assembly support members 530a-d each are triangular in shape, and are connected to a respective first or second track 540a or 540b. The members 530a-d provide lateral and vertical support to the first and second tracks 540a and 540b, and are configured to prevent or reduce bending or warping of the tracks 540a and 540b when under load from a container positioned on the container support assembly 300.

It should be appreciated that suitable sealing member, plates, or seals may be employed in accordance with the present disclosure to prevent unwanted leakage of any materials as the material flow from the container through the trailer.

It should be appreciated from the above that in various embodiments, the present disclosure provides a bulk material shipping container trailer comprising: a base structure including a container support assembly connection section; a container support assembly connected to the container support assembly connection section, the container support assembly including: a plurality of lateral support arms connected to the base, and a plurality of nesting supports connected to the support arms; and a gate opening assembly connected to the container support assembly connection section, wherein the gate opening assembly is configured to be positioned between the base structure and a bulk material shipping container when the bulk material shipping container is positioned on the container support assembly.

In various such embodiments of the bulk material shipping container trailer, the container support assembly connection section includes a first longitudinal member and a second longitudinal member.

In various such embodiments of the bulk material shipping container trailer, each of the first and second longitudinal members includes a front flat portion, a front angled portion, a center flat portion, a rear angled portion, and a rear flat portion.

In various such embodiments of the bulk material shipping container trailer, each of the one or more lateral support arms is connected to one of the front or rear flat portions of the first or second longitudinal members.

In various such embodiments of the bulk material shipping container trailer, the gate opening assembly is connected to the center flat portion of each of the first and second longitudinal members.

In various such embodiments of the bulk material shipping container trailer, a height of the gate opening assembly when connected to the container support assembly connection section is substantially the same as a height of the one or more corner nesting supports.

In various such embodiments of the bulk material shipping container trailer, the one or more lateral support arms extend outwardly from the base structure transversely to a longitudinal axis of the base structure, and wherein the container support assembly further includes one or more angled support arms extending outwardly from the base structure at non-perpendicular angles with respect to the longitudinal axis of the base structure.

In various such embodiments of the bulk material shipping container trailer, the gate opening assembly includes a bulk material shipping container gate mover.

In various such embodiments of the bulk material shipping container trailer, the bulk material shipping container gate mover includes: a track assembly integrally connected to and supported by the base structure, the track assembly including: a first track; and a second track spaced apart from the first track; and a gate mover assembly supported by the track assembly and configured to receive and engage a downwardly extending engagement member of a gate of a bulk material shipping container, wherein the gate mover assembly includes: a first trolley configured to move along the first track; a second trolley configured to move along the second track, and a trolley connector connected to the first trolley and the second trolley.

In various such embodiments of the bulk material shipping container trailer, the gate opening assembly further includes: one or more side braces; and one or more lateral gate opening assembly support members.

It should further be appreciated from the above that in various embodiments, the present disclosure provides a bulk material shipping container trailer comprising: a base structure including a container support assembly connection section, wherein the container support assembly connection section includes a first longitudinal member and a second longitudinal member; a container support assembly connected to the container support assembly connection section, the container support assembly including: a plurality of lateral support arms connected to the base, and a plurality of nesting supports connected to the support arms; and a gate opening assembly connected to the container support assembly connection section, wherein the gate opening assembly includes a bulk material shipping container gate mover configured to move a gate of a bulk material shipping container positioned on the container support assembly in a direction transverse to a longitudinal axis of the base structure.

In various such embodiments of the bulk material shipping container trailer, each of the first and second longitudinal members includes a front flat portion, a front angled portion, a center flat portion, a rear angled portion, and a rear flat portion, and wherein the front flat portion and the rear flat portion are at a first height relative to a ground level that is higher than the center flat portion, which is at a second height relative to the ground level.

In various such embodiments of the bulk material shipping container trailer, (a) a first lateral support arm of the four lateral support arms is connected to the front flat portion of the first longitudinal support member, (b) a second lateral support arm of the four lateral support arms is connected to the rear flat portion of the first longitudinal support member, (c) a third lateral support arm of the four lateral support arms is connected to the front flat portion of the second longitudinal support member, and (d) a fourth lateral support arm of the four lateral support arms is connected to the rear flat portion of the second longitudinal support member.

In various such embodiments of the bulk material shipping container trailer, the gate opening assembly is connected to the center flat portion of the each of the first and second longitudinal members.

In various such embodiments of the bulk material shipping container trailer, a height of the gate opening assembly when connected to the container support assembly connection section is substantially the same as a height of the four corner nesting supports.

In various such embodiments of the bulk material shipping container trailer, the four lateral support arms extend outwardly from the base structure transverse to a longitudinal axis of the base structure, and wherein the container support assembly further includes fourth angled support arms extending outwardly from the base structure at non-perpendicular angles with respect to the longitudinal axis of the base structure.

In various such embodiments of the bulk material shipping container trailer, the bulk material shipping container gate mover includes: a track assembly integrally connected to and supported by the base structure, the track assembly including: a first track; and a second track spaced apart from the first track; and a gate mover assembly supported by the track assembly and configured to receive and engage a downwardly extending handle or engagement member of the gate of the bulk material shipping container, wherein the gate mover assembly includes: a first trolley configured to move along the first track; a second trolley configured to move along the second track, and a trolley connector connected to the first trolley and the second trolley.

In various such embodiments of the bulk material shipping container trailer, the gate opening assembly further includes: first and second side braces configured to extend parallel to the longitudinal axis of the base structure; and four lateral gate opening assembly support members extending outwardly from the base structure, transverse to the longitudinal axis of the base structure.

It should be understood that modifications and variations may be effected without departing from the scope of the novel concepts of the present disclosure, and it should be understood that this application is to be limited only by the scope of the appended claims.

The claims are as follows:

1. A bulk material shipping container trailer comprising:
    a base structure including a container support assembly connection section;
    a container support assembly connected to the container support assembly connection section, the container support assembly including:
        a plurality of lateral support arms connected to the base, and
        a plurality of nesting supports connected to the support arms; and
    a gate opening assembly connected to the container support assembly connection section, wherein the gate opening assembly is configured to be positioned between the base structure and a bulk material shipping container when the bulk material shipping container is positioned on the container support assembly;
    wherein a height of the gate opening assembly is substantially the same as a height of the one or more corner nesting supports.

2. The bulk material shipping container trailer of claim 1, wherein the one or more lateral support arms extend outwardly from the base structure transversely to a longitudinal axis of the base structure, and wherein the container support assembly further includes one or more angled support arms extending outwardly from the base structure at non-perpendicular angles with respect to the longitudinal axis of the base structure.

3. The bulk material shipping container trailer of claim 1, wherein the gate opening assembly includes a bulk material shipping container gate mover.

4. The bulk material shipping container trailer of claim 3, wherein the bulk material shipping container gate mover includes:
    a track assembly integrally connected to and supported by the base structure, the track assembly including:
        a first track; and
        a second track spaced apart from the first track; and
    a gate mover assembly supported by the track assembly and configured to receive and engage a downwardly extending engagement member of a gate of a bulk material shipping container, wherein the gate mover assembly includes:
        a first trolley configured to move along the first track;
        a second trolley configured to move along the second track, and
        a trolley connector connected to the first trolley and the second trolley.

5. The bulk material shipping container trailer of claim 4, wherein the gate opening assembly further includes:
    one or more side braces; and
    one or more lateral gate opening assembly support members.

6. A bulk material shipping container trailer comprising:
    a base structure including a container support assembly connection section, wherein the container support assembly connection section includes a first longitudinal member and a second longitudinal member;
    a container support assembly connected to the container support assembly connection section, the container support assembly including:
        a plurality of lateral support arms connected to the base, and
        a plurality of nesting supports connected to the support arms; and
    a gate opening assembly connected to the container support assembly connection section, wherein the gate opening assembly includes a bulk material shipping container gate mover configured to move a gate of a bulk material shipping container positioned on the container support assembly in a direction transverse to a longitudinal axis of the base structure;
    wherein a height of the gate opening assembly is substantially the same as a height of the tour corner nesting supports.

7. The bulk material shipping container trailer of claim 6, wherein the four lateral support arms extend outwardly from the base structure transverse to a longitudinal axis of the base structure, and wherein the container support assembly further includes fourth angled support arms extending outwardly from the base structure at non-perpendicular angles with respect to the longitudinal axis of the base structure.

8. The bulk material shipping container trailer of claim 6, wherein the bulk material shipping container gate mover includes:
 a track assembly integrally connected to and supported by the base structure, the track assembly including:
  a first track; and
  a second track spaced apart from the first track; and
 a gate mover assembly supported by the track assembly and configured to receive and engage a downwardly extending handle or engagement member of the gate of the bulk material shipping container, wherein the gate mover assembly includes:
  a first trolley configured to move along the first track;
  a second trolley configured to move along the second track, and
  a trolley connector connected to the first trolley and the second trolley.

9. The bulk material shipping container trailer of claim 8, wherein the gate opening assembly further includes:
 first and second side braces configured to extend parallel to the longitudinal axis of the base structure; and
 four lateral gate opening assembly support members extending outwardly from the base structure, transverse to the longitudinal axis of the base structure.

\* \* \* \* \*